May 5, 1970  E. J. DELOBELLE  3,509,929
RUBBER ENVELOPE FOR RADIAL CARCASS OF A PNEUMATIC TIRE
Filed Dec. 26, 1967  2 Sheets-Sheet 1

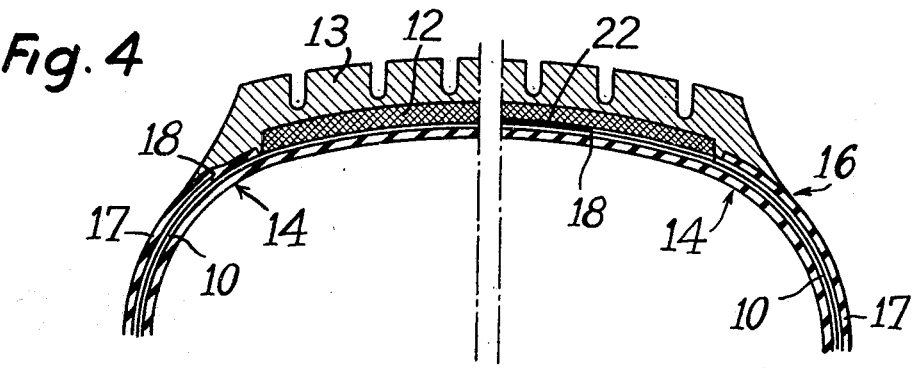
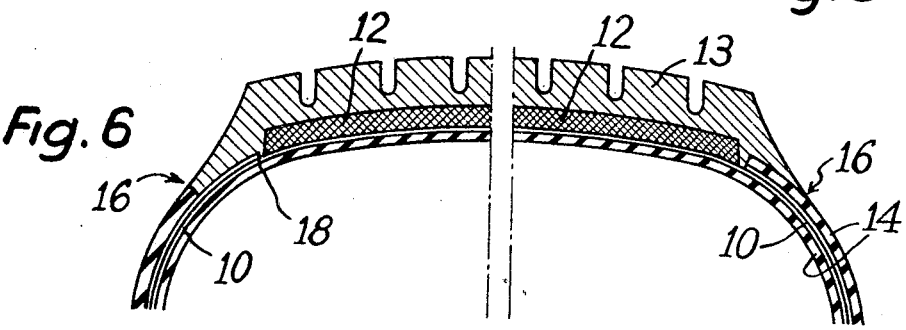
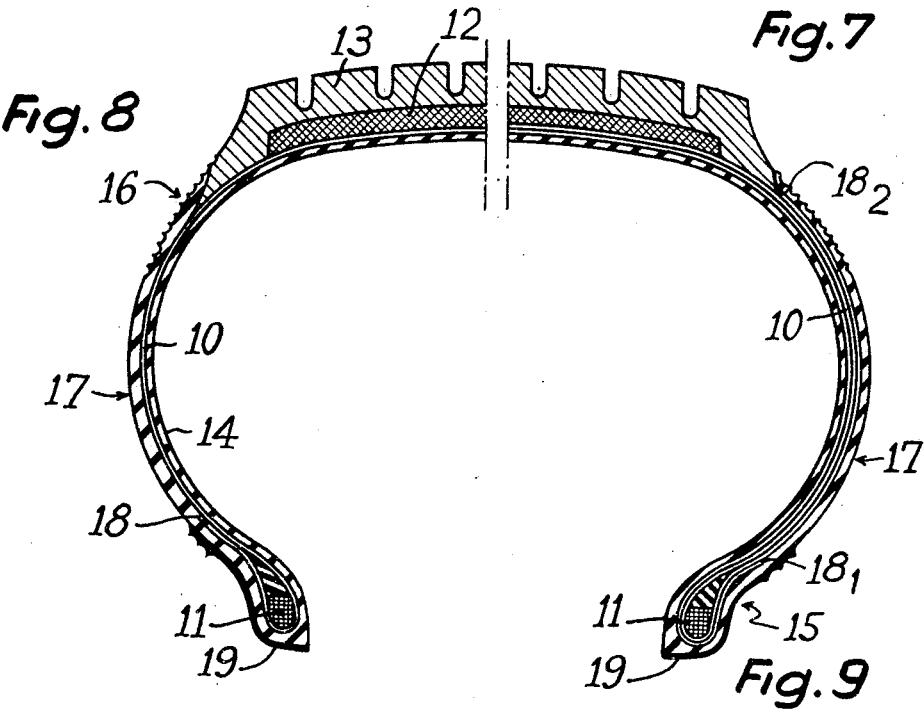

United States Patent Office 3,509,929
Patented May 5, 1970

3,509,929
RUBBER ENVELOPE FOR RADIAL CARCASS
OF A PNEUMATIC TIRE
Emile Jean Delobelle, Colombes, France, assignor to Pneumatiques, Caoutchouc Manufacturing et Plastiques Kleber-Colombes, Colombes, France, a French body corporate
Filed Dec. 26, 1967, Ser. No. 693,437
Claims priority, application France, Dec. 29, 1966, 89,434
Int. Cl. B60c 9/02
U.S. Cl. 152—354
4 Claims

ABSTRACT OF THE DISCLOSURE

This invention relates to pneumatic tires of the type having a radial carcass and a breaker layer between a crown of the carcass and a tread thereof. The invention consists in the provision of an uninterrupted layer of rubber having a thickness which is substantially constant, said layer of rubber being continuously applied over the whole internal surface of the carcass around the beads and over the external surface of the flanks of the carcass up to the shoulders of the tire where it is connected to the side parts of the tread, the side edges of the layer of rubber stopping before the edges of the breaker layer.

---

The present invention relates to improvements in the construction and manufacture of pneumatic tires of the type having a radial carcass and a breaker layer located between the crown of the carcass and the tread.

The method which is most generally used for manufacturing tires of the type referred to above consists in winding on a cylindrical tire-making drum one or more carcass layers (or "plies"), the edges of which are returned around the wires of the beads, whereafter the carcass is shaped to give it a substantially semi-toroidal form, then the side banks, the breaker layer and the tread are placed on the shaped carcass. This method requires numerous manual operations by the workman, which consequently introduce numerous factors of irregularity in manufacture. In addition, the number of the separate elements to be assembled on the drum for making the tire necessitates a corresponding number of storage stations on the distributing apparatus which feed the tire-making machines, so that the distributing apparatus is cumbersome and heavy. In order to simplify manufacture and in particular to reduce the number of manual operations by the workman, the invention proposes a new tire construction in which the side bands are constituted by the side parts of a layer of uninterrupted rubber of substantially constant thickness, continuously applied over the internal surface of the carcass, around the beads and over the external surface of the flanks of the carcass as far as the shoulders of the tire where it is connected to the side parts of the tread.

Said layer of rubber thus presents an evolute meridian width, the value of which is:

(a) At the most equal to twice the meridian width M of the carcass comprised between the beads less the width S of the breaker layer in order that the side edges of this layer of rubber stop on this side of the edges of the breaker layer applied to the crown of the carcass.

(b) At least equal to twice the meridian width M of the carcass comprised between the beads less the width C of the tread in order that the side edges of this layer of rubber join the edges of the tread.

This new style of tire having a radial carcass and breaker layer gives the tire itself various properties and advantages. It also enables its manufacture to be simplified particularly by permitting certain elements of the tire to be pre-assembled before said tire is actually made on the machine.

Figure 1:
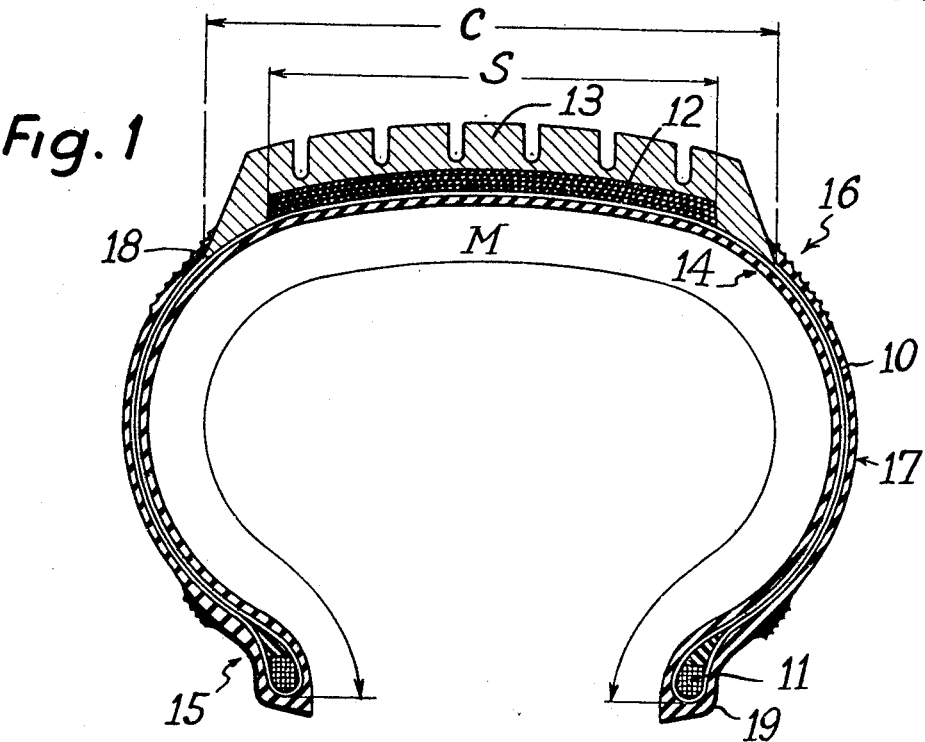
Figure 2:
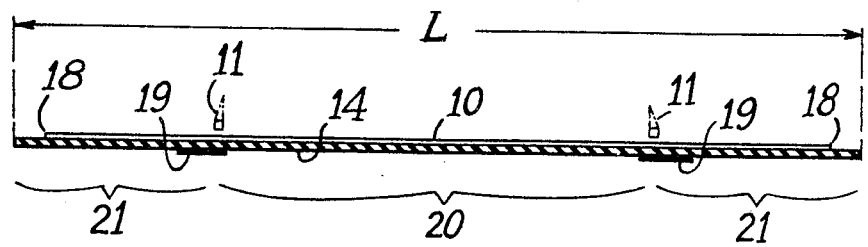
Figure 3:
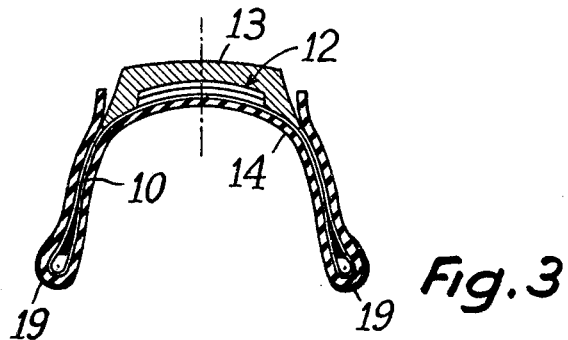

In order that the invention may be more clearly understood, reference will now be made to the accompanying drawings which show certain embodiments thereof by way of example, and in which:

FIG. 1 shows a transverse section of one form of tire according to the invention, FIGS. 2 and 3 show transverse sectional views schematically illustrating two phases of the manufacture of the tire of FIG. 1, FIGS. 4 to 7 show part transverse sections illustrating various modifications of the tire of FIG. 1, and FIGS. 8 and 9 show half sections of two other embodiments of the invention respectively.

Referring now to the drawings, in the embodiment illustrated in FIG. 1, the tire generally comprises a radial carcass 10 formed around wires 11 of the beads, a breaker layer 12 and a tread 13 having a pattern suitable for the use envisaged. The breaker layer 12 has an evolute width S substantially equal to that of the surface of the tread 13 and it may be constructed according to any one of the numerous constructions which have already been proposed, for example, by means of one or more superimposed layers of parallel cords forming a small angle with respect to the equatorial plane of the tire and oriented symmetrically in the layers of each pair. In the finished tire, this breaker layer is substantially inextensible and it has such a circumferential length that it is placed under tension when the tire is inflated.

In accordance with the invention, the tire comprises a layer of rubber 14 of substantially constant thickness and uninterruptedly extending over the whole of the inner surface of the carcass 10, around the beads 15 and over the external surface of the flanks of the carcass as far as the shoulders 16 of the tire where it is connected to the side parts of the tread.

This layer of rubber 14 thus constitutes, in the internal part of the tire, a coating for the carcass 10.

It also constitutes the external part of the beads 15 as well as the side bands 17 which ensure the external protection of the carcass in the region of the flanks. This layer of rubber 14 thus presents an evolute meridian width L equal to about twice the width of the meridian contour M of the carcass between the wires 11 of the beads reduced by the width S of the breaker layer 12. However, the width L is at least equal to twice the width M less the flat width C of the tread, this being expressed by the following relationship: $2M - S \geqslant L \geqslant 2M - C$.

In the embodiment of FIG. 1, the carcass 10 is itself constituted by a single layer of radial cords, the side parts of this layer being returned around the wires 11, from the inside to the outside, and extending continuously in the flanks as far as the shoulders 16 of the tire. The edges 18 of the carcass layer 10 stop slightly on this side of the edges of the layer of rubber 14 since the layer 10 has an evolute meridian width which is slightly smaller than that of the layer of rubber as may be seen in FIG. 2 for example. Finally, the beads 15 are provided externally with a rubber 19 in order to protect them when in contact with the rim of the wheel.

The above described tire may be made in the following manner:

On a cylindrical tire-making drum having an expansible surface (as described for example in United States patent specification No. 57,862), there is wound, in a complete turn, a layer of calendered rubber 14 of uniform thickness and of width at the most equal to the width L defined above, as well as a carcass ply 10, which is slightly smaller, in order to form a cylindrical carcass skeleton (FIG. 2). Rim rubbers 19 which were previously placed on the same drum beneath the layer 14, are then guided towards the right, the wires 11 having been made separately as usual, then the central part 20 of the skeleton between the wires 11 is expanded radially whilst these wires are brought closer to one another.

The breaker layer 12 and the tread 13 are then placed on the crown of the carcass 10 having taken a semitoroidal form, and the side parts 21 of the ply 10 and the layer of rubber 14 are folded back around the wires until the edges of this layer 14 are joined to the edges of the tread 13. The connection between the various elements of the tire and particularly the connection between the edges of the rubber layer 14 and the tread 13 is completed as usual by a knurling or milling operation.

The above method is simpler than the conventional method because the side bands 17 are made by the side parts of the layer of rubber 14 at the same time as the side parts of the carcass 10 are lifted up, this avoiding the separate manual positioning of the each side band. The operation may thus be effected more rapidly and with greater accuracy, since the centering on the drum of the layer 14 is easy.

However, in addition, the construction of tires according to the invention enables the manufacture of the tire to be more simplified by permitting the various elements of the skeleton to be preassembled. Thus, for example, the layer of rubber 14 may be assembled earlier with the carcass ply or plies 10 and even with the rim rubbers 19 in the form of a strip of extended length supplied to the tire-making machine. This preassembling may be effected more accurately than manual assembling on the drum and this gives the manufacture a greater uniformity in the quality of the tires. If, in addition the breaker layer 12 and the tread 13 are also preassembled, it may be seen that the manufacture itself is reduced to the assembling of a small number of elements and that the manual operations for positioning these elements on the drum are much reduced.

The construction of the tire described with reference to FIG. 1 and the process described above may be modified in various ways, some of which are shown in FIGS. 4 to 9.

In the case of FIG. 4, the tire differs from that of FIG. 1 only by the fact that the edges of the rubber layer 14 are folded back beneath the edges of the tread 13 and not above as in the case of FIGS. 1 and 3.

In FIG. 5, a carcass ply 10 is initially used whose evolute meridian width is greater than L and consequently greater than the width of the layer of rubber 14. The edge 18 of the ply 10 is folded back over the crown of the carcass, beneath the breaker layer 12. The gap between the two edges of the carcass ply may be filled by a cushion of rubber 22, if desired. Alternatively, the edges of the carcass ply could join or be covered by one another beneath the breaker layer 12 along a width which may reach that of the breaker layer. Here again the edges of the layer of rubber are folded back underneath the edges of the breaker layer.

In FIG. 6, the carcass ply 10 is wider than the layer of rubber 14 but its width is not greater than $2M-S$, so that its edges 18 stop in the immediate vicinity of the edges of the breaker layer 12. The layer of rubber 14 is joined edge to edge with the tread.

In FIG. 7, the layer of rubber 14 and the carcass ply 10 are of the same width, and this gives the advantage that it may be obtained directly by cutting from a layer of "cord" fabric provided with its layer of rubber by calendering.

In FIG. 8, the carcass ply 10 has on the other hand a width which is substantially smaller than L so that the rising parts 18 of the carcass ply stop below the flank.

A tire of this type therefore has only a single ply in the flank.

In the various embodiments described above, it must be considered that the carcass ply 10 may be replaced in every case by two or more superimposed plies of the same width when it is desired to increase the resistance of the carcass for tires of large dimension. The carcass plies 10 may also have different widths in order to obtain a staggering of the edges of the plies.

FIG. 9 shows, for example, an embodiment in which the carcass comprises two superimposed plies 10 of different widths, the edges of one terminating at $18_1$ below the flank whilst the edges of the other terminate at $18_2$ above the flank in the region of the shoulders of the tire. These two latter embodiments according to FIGS. 8 and 9 enable a bead to be obtained which is more reinforced, for a flank suppleness determined by the number of carcass plies, this enabling reinforcing elements usually associated with the wire, such as flippers and enveloping strips, to be eliminated, if necessary.

Apart from the particular advantages mentioned in the description of the above modifications, the general constitution of the tires according to the invention enables the carcass to be internally reinforced by a thickness of rubber which, once the tire is finished, ensures the protection of the carcass and opposes the formation of radial slots which are sometimes observed after a certain time of operation and which are due to the radial arrangement of the carcass cords. In addition, in the flanks of the finished tire, the carcass layer or layers 10 are located in the center of the thickness of the wall of the tire, this being particularly favourable for a tire of this type in which the supple flanks are much more in flexion than the tires of conventional type with crossed carcass.

I claim:
1. In a beaded-edge pneumatic tire of the type having a radial carcass and breaker layer between a crown of the carcass and a tread thereof, the improvement which consists in the provision of an uninterrupted layer of rubber having a thickness which is substantially constant and of evolute meridian width L defined by the equation $2M-S \geqslant L \geqslant 2M-C$ in which M is the meridian width of the carcass between the beads of the tire, S the width of the breaker layer and C the width of the tread, said layer of rubber being continuously applied over the whole internal surface of the carcass around said beads and over the external surface of the flanks of the carcass up to the shoulders of the tire where it is connected to the side parts of said tread, the side edges of said layer of rubber stopping before the edges of said breaker layer.

2. A tire according to claim 1, wherein the evolute meridian width of the plies of the carcass is not greater than the evolute meridian width L of said rubber layer, the side parts of the carass plies being returned around the beads from the inside to the outside and extend at least as far as the lower part of the flanks but not beyond the shoulders of the tire.

3. A tire according to claim 1, wherein the evolute meridian width of the plies of the carcass is greater than the evolute meridian width L of said rubber layer, the side parts of the carcass plies extending beyond the lateral edges of the layer of rubber being inserted between the crown of the carcass and said breaker layer.

4. A tire according to claim 1, wherein the side edges of said rubber layer are applied above or below the edges of the tread.

References Cited

UNITED STATES PATENTS

| 3,190,339 | 6/1965 | Leibee | 152—354 |
| 3,232,331 | 2/1966 | Cappa | 152—354 |

FOREIGN PATENTS

| 1,319,364 | 1/1963 | France. |

ARTHUR L. LA POINT, Primary Examiner

C. B. LYON, Assistant Examiner

U.S. Cl. X.R.

152—360